US010316223B2

(12) United States Patent
Yoon et al.

(10) Patent No.: US 10,316,223 B2
(45) Date of Patent: Jun. 11, 2019

(54) PRESSURE-SENSITIVE ADHESIVE COMPOSITION

(71) Applicant: LG CHEM, LTD., Seoul (KR)

(72) Inventors: Sung Soo Yoon, Daejeon (KR); No Ma Kim, Daejeon (KR); In Ho Hwang, Daejeon (KR); Jeong Min Ha, Daejeon (KR); In Kyu Park, Daejeon (KR); Min Ki Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1425 days.

(21) Appl. No.: 14/030,810

(22) Filed: Sep. 18, 2013

(65) Prior Publication Data

US 2014/0017420 A1 Jan. 16, 2014

Related U.S. Application Data

(63) Continuation of application No. PCT/KR2012/002157, filed on Mar. 23, 2012.

(30) Foreign Application Priority Data

Mar. 23, 2011 (KR) .................. 10-2011-0025992
Mar. 23, 2012 (KR) .................. 10-2012-0029990

(51) Int. Cl.
*C09J 133/10* (2006.01)
*G02B 1/04* (2006.01)
*C09J 4/06* (2006.01)
*C09J 133/06* (2006.01)
*C09J 133/04* (2006.01)
*G02F 1/1335* (2006.01)
*G02B 5/30* (2006.01)
*C08F 222/10* (2006.01)

(52) U.S. Cl.
CPC ............... *C09J 133/10* (2013.01); *C09J 4/06* (2013.01); *C09J 133/04* (2013.01); *C09J 133/066* (2013.01); *G02B 1/04* (2013.01); *C08F 222/1006* (2013.01); *G02B 5/3033* (2013.01); *G02F 1/133528* (2013.01); *G02F 2202/28* (2013.01); *Y10T 428/1077* (2015.01); *Y10T 428/2848* (2015.01); *Y10T 428/2891* (2015.01)

(58) Field of Classification Search
CPC ...... C08J 133/10; C08J 133/08; C08J 133/04; C09J 4/06; C09J 2205/31
See application file for complete search history.

(56) References Cited

U.S. PATENT DOCUMENTS 5,391,406 A * 2/1995 Ramharack .......... C09J 133/062
427/208.2
2011/0234948 A1 * 9/2011 Yoon .......................... C09J 4/06
349/96

FOREIGN PATENT DOCUMENTS

| JP | 2003-049141 A | 2/2003 |
|---|---|---|
| JP | 2006-235568 A | 9/2006 |
| JP | 2009-173875 A | 8/2009 |
| KR | 10-2006-0086853 A | 8/2006 |
| KR | 10-2009-0111261 A | 10/2009 |
| KR | 10-2010-0003714 A | 1/2010 |
| KR | 10-2010-0008773 A | 1/2010 |
| KR | 10-2010-0070999 A | 6/2010 |
| TW | 201038695 | 11/2010 |
| WO | 2009/088205 A2 | 7/2009 |
| WO | WO 2009088205 A2 * | 7/2009 |
| WO | 2009/131321 A2 | 10/2009 |
| WO | 2010/002196 A2 | 1/2010 |
| WO | 2010/008231 A2 | 1/2010 |
| WO | 2010/071383 A2 | 6/2010 |

OTHER PUBLICATIONS

Tauber, A., Scherzer, T., Weiβ, I. et al. UV curing of a pressure sensitive adhesive coating studied by real-time FTIR spectroscopy and laboratory scale curing experiments. Journal of Coatings Technology (2002) 74: 41. retrieved online. Retrieved on [Aug. 22, 2016]. Retrieved from <URL://http://link.springer.com/article/10.1007/BF02720163>.*
Decker, C. and Moussa, K. (1988), A new method for monitoring ultra-fast photopolymerizations by real-time infra-red (RTIR) spectroscopy. Makromol. Chem., 189: 2381-2394. [online]. retrieved on [Aug. 22, 2016]. Retrieved from <URL://http://onlinelibrary.wiley.com/doi/10.1002/macp.1988.021891016/full>.*
Johsson et al. Degree of Conversion and Rate of Polymerization as a function of light intensity. Nov. 1995, pp. 561-567. Found in RadTech '95 Asia: Radiation Curing Conference. [online]. Retrieved on [Aug. 22, 2016]. Retrieved from <URL://http://www.iaea.org/inis/collection/NCLCollectionStore/_Public/28/042/28042403.pdf>.*
Czech et al. Photoreactivity Adjustment of Acrylic PSA. Review of Advance Material Science. 14 (2007), 141-150.*
Asahara, J., Hori, N., Takemura, A. and Ono, H. (2003), Crosslinked acrylic pressure-sensitive adhesives. I. Effect of the crosslinking reaction on the peel strength. J. Appl. Polym. Sci., 87: 1493-1499.*
Gauthier et al. A new method for quantifying the intensity of C=C band of dimethacrylate dental monomers in their FTIR amd Raman spectra. Biomaterials 26 (2005) 6440-6448.*
Discacciati, José Augusto César, Neves, Alisson Discacciati, Oréfice, Rodrigo Lambert, Pimenta, Flávio Juliano Garcia Santos, & Sander, Herbert Haueisen. (2004). Effect of light intensity and irradiation time on the polymerization process of a dental composite resin. Materials Research, 7(2), 313-318.*

(Continued)

*Primary Examiner* — Sanza L. McClendon
(74) *Attorney, Agent, or Firm* — Dentons US LLP

(57) ABSTRACT

A pressure-sensitive adhesive composition, a pressure-sensitive adhesive polarizing plate and a liquid crystal display device are provided. The pressure-sensitive adhesive composition has excellent durability reliability under extreme conditions such as high temperature and/or humidity conditions, and shows superior workability such as cuttability or re-workability. Also, when the pressure-sensitive adhesive composition is applied to a polarizing plate or a liquid crystal display device, the composition can effectively prevent light leakage. Such a pressure-sensitive adhesive exhibits excellent characteristics, for example, even when the pressure-sensitive adhesive is applied to a 20-inch or more large display device.

6 Claims, No Drawings

(56) References Cited

OTHER PUBLICATIONS

Office Action of European Patent Office in Appl'n No. 12761043.4, dated Apr. 5, 2016.
Office Action of the Japanese Patent Office in Appl'n No. 2014-501015, dated Oct. 27, 2014.

* cited by examiner

PRESSURE-SENSITIVE ADHESIVE COMPOSITION

This application is a Continuation Bypass Application of International Patent Application No. PCT/KR2012/002157, filed Mar. 23, 2012, and claims the benefit of Korean Patent Application Nos. 10-2011-0025992 filed on Mar. 23, 2011, and 10-2012-0029990 filed on Mar. 23, 2012, in the Korean Intellectual Property Office, the disclosure of which are incorporated herein by reference.

BACKGROUND

1. Field of the Invention

The present application relates to a pressure-sensitive adhesive composition.

2. Discussion of Related Art

A liquid crystal display device (LCD) is a device that displays an image through liquid crystal present between two transparent substrates.

When a voltage is applied to the LCD through electrodes connected to the liquid crystal, a molecular arrangement mode of the crystal display is changed, and thus the transmissivity of light is varied, thereby displaying an image.

Basically, the LCD includes two transparent substrates, a liquid crystal panel including liquid crystal between the substrates, and a polarizing plate attached to the transparent substrate of the liquid crystal panel.

The polarizing plate includes an iodine-based compound or a dichroic polarizing material arranged in a certain direction, and has a multilayer structure which includes a protective film to protect a polarizing element formed on one or both surfaces thereof. Also, the polarizing plate may further include a retardation film having a unidirectional molecular arrangement, or a wide viewing-angle compensation film such as a liquid crystal-type film. Respective films constituting such a multilayered polarizing plate are made of materials having different molecular structures and compositions, and thus show different physical properties. As a result of difference in contraction or expansion behavior of materials having a unidirectional molecular arrangement, dimensional stability is insufficient, especially under high-temperature or high-temperature/humidity conditions. Therefore, when the polarizing plate is fixed by means of a pressure-sensitive adhesive, stresses are concentrated on a TAC layer due to the contraction or expansion under high-temperature or high-temperature/humidity conditions, which leads to problems such as birefringence and light leakage.

A representative method used to solve the above problems includes a method of designing a pressure-sensitive adhesive to have a stress relaxation property so that the pressure-sensitive adhesive can be easily crept and deformed with respect to external stress. For example, Korean Patent Publication No. 1998-79266 and Japanese Patent Publication Nos. 2002-47468 and 2003-49141 disclose a method of mixing a high molecular weight polymer that has a functional group which can react with a cross-linking agent, with a low molecular weight polymer that has a small amount of a cross-linkable functional group or no cross-linkable functional group.

However, the pressure-sensitive adhesive compositions disclosed in the patent documents have problems in that creeping or squeezing of a pressure-sensitive adhesive may be caused due to poor cuttability in manufacture of a polarizing plate, which leads to a decrease in yield.

Another method used to prevent light leakage includes a method of designing a very hard pressure-sensitive adhesive. Such a pressure-sensitive adhesive may serve to minimize stress by suppressing the contraction and expansion of a polarizing plate under high temperature or high-temperature/humidity conditions and concentrate the stress on the outermost layer of the polarizing plate, which allows the attainment of superior optical properties.

In order to realize a hard pressure-sensitive adhesive, the modulus of elasticity of the pressure-sensitive adhesive needs to be increased. However, as the modulus of elasticity of the pressure-sensitive adhesive increases, the durability may be degraded due to an accompanying decrease in strength of the pressure-sensitive adhesive. Also, the use of a common single cross-linking structure makes it difficult to achieve a modulus of elasticity at which light leakage is suppressed and durability is sufficient. Accordingly, a method of forming a separate cross-linking structure by adding a photoinitiator and a multifunctional acrylate to a pressure-sensitive adhesive composition used to form a conventional single cross-linking structure is also known in the art.

SUMMARY OF THE INVENTION

The present application provides a pressure-sensitive adhesive composition.

One aspect of the present application provides a pressure-sensitive adhesive composition including a cross-linkable acrylic polymer, a cross-linking agent that is capable of forming a cross-linking structure by being reacted with the cross-linkable acrylic polymer and a multifunctional acrylate. The pressure-sensitive adhesive composition may form a so-called interpenetrating polymer network (hereinafter referred to as "IPN") after being cured. If the pressure-sensitive adhesive composition forms the IPN, the X calculated using the following General Equation 1 may be in the range of 60% to 80%.

$$X = [1-(AI/BI)/(AO/BO)] \times 100 \qquad \text{General Equation 1}$$

In General Equation 1, "AI" represents an area of peak observed between 795 cm$^{-1}$ and 820 cm$^{-1}$ in IR spectrum of the pressure-sensitive adhesive composition in which the IPN is formed, "BI" represents an area of peak observed between 1,780 cm$^{-1}$ and 1,650 cm$^{-1}$ in the IR spectrum of the pressure-sensitive adhesive composition in which the IPN is formed, "AO" represents an area of peak observed between 795 cm$^{-1}$ and 820 cm$^{-1}$ in the IR spectrum of the pressure-sensitive adhesive composition before forming the IPN, and "BO" represents an area of peak observed between 1,780 cm$^{-1}$ and 1,650 cm$^{-1}$ in the IR spectrum of the pressure-sensitive adhesive composition before forming the IPN.

The term "pressure-sensitive adhesive composition in which the IPN is formed" as used herein may refer to a cured pressure-sensitive adhesive composition. The term "curing" as used herein may refer to a process of allowing the pressure-sensitive adhesive composition to express pressure-sensitive adhesive properties through physical or chemical reactions and interactions of components in the pressure-sensitive adhesive composition. In this specification, the cured pressure-sensitive adhesive composition or the pressure-sensitive adhesive composition in which the IPN is formed may be simply referred to as a pressure-sensitive adhesive.

The term "IPN" as used herein may refer to a state where two or more cross-linking structures are formed in the pressure-sensitive adhesive simultaneously. According to one illustrative embodiment, the two or more cross-linking structures may be in a state in which they are entangled or interpenetrate to each another.

For example, if the IPN is formed in the pressure-sensitive adhesive composition including a cross-linkable acrylic polymer, a cross-linking agent capable of forming a cross-linking structure by being reacted the cross-linkable polymer and a multifunctional acrylate, the pressure-sensitive adhesive composition may have a cross-linking structure (hereinafter referred to as a "first cross-linking structure") formed by the acrylic polymer cross-linked by the cross-linking agent, and a cross-linking structure (hereinafter referred to as a "second cross-linking structure") formed by the polymerized multifunctional acrylate.

According to one illustrative embodiment, the first and second cross-linking structures may be independently present in a pressure-sensitive adhesive, and may be present in a state in which they are not chemically reacted with each other. In this state, the first and second cross-linking structures may be present in the pressure-sensitive adhesive in a state in which they are entangled or interpenetrate to each another.

For example, a polymer having a weight average molecular weight (Mw) of 1,000,000 may be used as the cross-linkable acrylic polymer. In this specification, the term "weight average molecular weight" may mean a value converted from that of a polystyrene standard as measured using gel permeation chromatography (GPC). Also, unless otherwise defined in this specification, the term "molecular weight" may mean a "weight average molecular weight." A polymer having a molecular weight of 1,000,000 or more may be used to provide a pressure-sensitive adhesive composition or pressure-sensitive adhesive having excellent durability under high temperature and/or humidity conditions and showing excellent workability such as coatability.

For example, a polymer including a (meth)acrylic acid ester monomer and a cross-linkable monomer as polymerized units may be used as the cross-linkable acrylic polymer.

As such, an alkyl(meth)acrylate may be, for example, used as the (meth)acrylic acid ester monomer. Also, an alkyl(meth)acrylate having an alkyl group having 1 to 14 carbon atoms may be used in an aspect of the control of cohesion, glass transition temperature ($T_g$) and a pressure-sensitive adhesive property. Such a monomer that may be used herein may include methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl(meth)acrylate and tetradecyl(meth)acrylate, which may be used alone or in combination.

The cross-linkable monomer is copolymerized with another monomer configured to form an acrylic polymer, for example, the alkyl(meth)acrylate, so as to form a polymer, and provides a cross-linkable functional group to the polymer after the copolymerization. Here, any kinds of monomers may be used as long as they function as described above.

For example, the cross-linkable monomer that may be used herein may include a hydroxyl group-containing monomer, a carboxyl group-containing monomer or a nitrogen-containing monomer. The hydroxyl group-containing monomer that may be used herein may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate, the carboxyl group-containing monomer that may be used herein may include (meth)acrylic acid, 2-(meth)acryloyloxy acetic acid, 3-(meth)acryloyloxy propylate, 4-(meth)acryloyloxy butyric acid, acrylic acid dimer, itaconic acid, maleci acid or maleci anhydride, and the nitrogen-containing monomer that may be used herein may include (meth)acrylamide, N-vinyl pyrrolidone or N-vinyl caprolactam, but the present application is not limited thereto. One or two or more of the cross-linkable monomers may be included in the polymer.

The cross-linkable acrylic polymer may include, for example, a (meth)acrylic acid ester monomer at 80 parts by weight to 99.9 parts by weight, and a cross-linkable monomer at 0.01 parts by weight to 20 parts by weight, as polymerized units, but the present application is not limited thereto. Unless otherwise particularly defined in this specification, the term "part(s) by weight" means a weight ratio between respective components.

The cross-linkable acrylic polymer may further include a proper comonomer as a polymerized unit, as necessary. For example, the monomer of the following Formula 1 may be included as a polymerized unit in the acrylic polymer so as to control a glass transition temperature or give other functionalities.

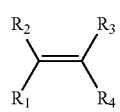

Formula 1

In Formula 1, $R_1$ to $R_3$ each independently represent hydrogen or an alkyl group, and $R_4$ represents a cyano group; a phenyl group unsubstituted or substituted with an alkyl group; an acetyloxy group; or $COR_5$, wherein $R_5$ represents an amino group or glycidyloxy group which is unsubstituted or substituted with an alkyl group or an alkoxyalkyl group.

In Formula 1, the alkyl group or alkoxy group may include, for example, a substituted or unsubstituted alkyl group or alkoxy group having 1 to 20 carbon atoms, 1 to 16 carbon atoms, 1 to 12 carbon atoms, 1 to 8 carbon atoms, or 1 to 4 carbon atoms. The alkyl group or alkoxy group may have a linear, branched or cyclic structure. Examples of the alkyl group or alkoxy group may include a methyl group, an ethyl group, a methoxy group, an ethoxy group, a propoxy group or a butoxy group, but the present application is not limited thereto.

Examples of the comonomer of Formula 1 may include a nitrogen-containing monomer such as (meth)acrylonitrile, (meth)acrylamide, N-methyl(meth)acrylamide or N-butoxy methyl(meth)acrylamide; a styrene-based monomer such as styrene or methyl styrene; glycidyl(meth)acrylate; or a vinyl ester of carboxylic acid such as vinyl acetate, which may be used alone or in combination, but the present application is not limited thereto. When the cross-linkable acrylic polymer includes the monomer of Formula 1, the monomer may be present in an amount of 20 parts by weight, based on the total content of the (meth)acrylic acid ester monomer.

For example, the cross-linkable acrylic polymer may be prepared by polymerizing a monomer mixture, which is obtained by selecting and blending proper monomers among the monomers, as necessary, using a conventional method such as solution polymerization, photopolymerization, bulk polymerization, suspension polymerization or emulsion polymerization.

For example, a compound having two or more functional groups, which can react with the cross-linkable functional group present in the polymer, may be used as the cross-linking agent configured to form a cross-linking structure with the polymer.

Specific kinds of such a cross-linking agent are not particularly limited. For example, a known cross-linking agent such as an isocyanate cross-linking agent, an epoxy cross-linking agent, an aziridine cross-linking agent or a metal chelate cross-linking agent may be used herein. Suitable kinds of the known cross-linking agent may be selected and used in consideration of reactivity with the cross-linkable functional group of the acrylic polymer.

As such, the isocyanate cross-linking agent that may be used herein may include a compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound obtained by reaction of one or two or more of the above-described compounds with a polyol, for example, trimethylolpropane. Also, the epoxy cross-linking agent that may be used herein may include ethyleneglycol diglycidyl ether, triglycidyl ether, trimethylolpropane triglycidyl ether, N,N,N',N'-tetraglycidyl ethylenediamine or glycerin diglycidyl ether, the aziridine cross-linking agent that may be used herein may include N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) or tri-1-aziridinyl phosphinoxide, and the metal chelate cross-linking agent that may be used herein may include a compound in which a multivalent metal such as aluminum, iron, zinc, tin, titanium, antimony, magnesium or vanadium coordinates with acetylacetone or ethyl acetoacetate, but the present application is not limited thereto.

For example, the cross-linking agent may be included in an amount of 0.01 parts by weight to 5 parts by weight, 0.01 parts by weight to 3 parts by weight, or 0.1 to 2 parts by weight in the pressure-sensitive adhesive composition, relative to 100 parts by weight of the cross-linkable acrylic polymer. The content of the cross-linking agent may be controlled to maintain excellent durability and cohesion.

The pressure-sensitive adhesive composition may include a multifunctional acrylate forming a cross-linking structure regardless of a cross-linking structure of the acrylic polymer cross-linked by the cross-linking agent.

When the pressure-sensitive adhesive composition includes the cross-linkable acrylic polymer, the cross-linking agent and the multifunctional acrylate, the polymer and the cross-linking agent react with each other during a drying, heating or aging process to form a cross-linking structure, and the multifunctional acrylate may form a second cross-linking structure by means of a radical polymerization reaction which is performed independently from or simultaneously with the above-described process.

For example, kinds of a multifunctional acrylate that does not react with the cross-linkable acrylic polymer and the cross-linking agent may be used as the multifunctional acrylate. For example, the multifunctional acrylate that may be used herein may include a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycoladipate di(meth)acrylate, hydroxypuivalic acid neopentylglycol di(meth)acrylate, dicyclopentanyl(dicyclopentanyl)di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanoldi(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or urethane(meth)acrylate (for example, a reaction product of an isocyanate monomer or trimethylolpropane tri(meth)acrylate).

According to one illustrative embodiment, a trifunctional or tri- or more functional acrylate having a molecular weight of less than 1,000 may be used as the multifunctional acrylate. In this case, the pressure-sensitive adhesive may have more excellent durability.

Also, a multifunctional acrylate having a ring structure or urethane bond may be used as the multifunctional acrylate. As such, kinds of the ring structure are not particularly limited. For example, the ring structure may be a carbocyclic or heterocyclic structure; or a monocyclic or polycyclic structure. Examples of the ring structure may include a cycloalkyl structure having 3 to 12 carbon atoms or 3 to 8 carbon atoms, such as cyclopentane, cyclohexane or cycloheptane. The number of the ring structures included in the acrylate may be one or more, 1 to 5, or 1 to 3. In addition to the carbon atoms, at least one heteroatom such as oxygen, sulfur or nitrogen may be included in the ring structure.

Examples of the multifunctional acrylate having a ring structure or a urethane bond may include a monomer having an isocyanurate structure such as tris(meth)acryloxy ethyl isocyanurate, an isocyanate compound having a ring structure such as isoboron diisocyanate, and an isocyanurate-modified urethane acrylate obtained by reaction of a multifunctional acrylate such as trimethylolpropane tri(meth)acrylate or pentaerythritol tri(meth)acrylate, but the present application is not limited thereto.

The multifunctional acrylate may be included in an amount of 15 parts by weight to 40 parts by weight or 15 parts by weight to 30 parts by weight in the pressure-sensitive adhesive composition, relative to 100 parts by weight of the cross-linkable acrylic polymer.

Within this range, the multifunctional acrylate may effectively form an IPN, and maintain the modulus of elasticity and peel strength of the pressure-sensitive adhesive to a suitable extent.

The pressure-sensitive adhesive composition may further include proper radical initiator to effectively form a cross-linking structure by means of the multifunctional acrylate. According to one illustrative embodiment, the radical initiator includes an initiator that can induce radical polymerization of the multifunctional acrylate by irradiation with light such as ultraviolet (UV) rays or electron beams. Here, a photoinitiator may be used as the initiator.

For example, a benzoin-, hydroxy ketone-, aminoketone- or phosphine oxide-based photoinitiator may be used as the photoinitiator. The photoinitiator that may be used herein may include, for example, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone(thioxanthone), 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] or 2,4,6-trimethylbenzoyl-diphenyl-phosphineoxide.

The pressure-sensitive adhesive composition may be included in an amount of 0.01 parts by weight to 10 parts by weight, relative to 100 parts by weight of the radical initiator. More particularly, the radical initiator may be used at a proper content in consideration of an X value calculated according to General Equation 1.

The pressure-sensitive adhesive composition may further include a silane coupling agent, as necessary. The coupling agent may function to improve heat resistance and moisture resistance of a pressure-sensitive adhesive and maintain excellent adhesive reliability even when the pressure-sensitive adhesive is kept for an extended period of time under high temperature or humidity conditions.

For example, the silane coupling agent may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isoisocyanatopropyl triethoxy silane, γ-acetoacetatepropyl trimethoxysilane, γ-acetoacetatepropyl triethoxy silane, β-cyanoacetyl trimethoxy silane, β-cyanoacetyl triethoxy silane or acetoxyaceto trimethoxy silane, which may be used alone or in combination. According to one illustrative embodiment, a silane coupling agent containing an acetoacetate group or a β-cyanoacetyl group may be used as the silane coupling agent. The silane coupling agent may be included in an amount of 0.01 parts by weight to 5 parts by weight or 0.01 parts by weight to 1 part by weight, relative to 100 parts by weight of the acrylic polymer. Proper pressure-sensitive adhesive strength and durability reliability may be maintained within this range.

Also, the pressure-sensitive adhesive composition may further include a tackifier. For example, the tackifier that may be used herein may include a hydrocarbon-based resin, a rosin resin, a rosin ester resin, a terpene resin, a terpene phenol resin, a polymerized rosin resin, a polymerized rosin ester resin or the above-described hydrogen additive. For example, the tackifier may be included in an amount of 1 part by weight to 100 parts by weight in the composition, relative to 100 parts by weight of the acrylic polymer. In this case, proper compatibility and cohesion may be secured within this range.

In addition, the pressure-sensitive adhesive composition may further include at least one additive selected from the group consisting of an epoxy resin, a cross-linking agent, a UV stabilizer, an antioxidant, a coloring agent, a reinforcing agent, a filler, an antifoaming agent, a surfactant and a plasticizer, as necessary.

After curing of the pressure-sensitive adhesive composition, that is, formation of IPN, the pressure-sensitive adhesive composition has the X value of 60% to 80%, as calculated according to the General Equation 1.

In General Equation 1, the "AI" represents an area of peak that is observed in the IR spectrum of the pressure-sensitive adhesive composition after the curing process, that is, the pressure-sensitive adhesive composition in which IPN is formed and that is observed due to carbon-carbon double bonds existed in the pressure-sensitive adhesive composition, more particularly, peak observed between wave numbers of 795 $cm^{-1}$ and 820 $cm^{-1}$, and the "BI" represents an area of peak that is observed in the IR spectrum of the pressure-sensitive adhesive composition in which IPN is formed and that is observed due to carbonyl groups existed in the pressure-sensitive adhesive composition, more particularly, peak observed between wave numbers of 1,780 $cm^{-1}$ and 1,650 $cm^{-1}$.

Also, in General Equation 1, the "AO" represents an area of peak that is observed in the IR spectrum of the pressure-sensitive adhesive composition before the curing process, that is, before forming the IPN, that is observed due to carbon-carbon double bonds existed in the pressure-sensitive adhesive composition, more particularly, peak observed between wave numbers of 795 $cm^{-1}$ and 820 $cm^{-1}$, and the "BO" represent an area of peak observed in the IR spectrum of the pressure-sensitive adhesive composition before forming the IPN, and that is observed due to carbonyl groups existed in the pressure-sensitive adhesive composition, more particularly, peak observed between wave numbers of 1,780 $cm^{-1}$ and 1,650 $cm^{-1}$.

The X value calculated according to General Equation 1 may mean a percentage (%) of multifunctional acrylates which are converted into the cross-linking structure in the composition during the curing process of the pressure-sensitive adhesive composition, that is, the process of forming an IPN.

In general, a method of forming a hard pressure-sensitive adhesive is based only on the modulus of elasticity of the pressure-sensitive adhesive. However, even when the pressure-sensitive adhesive in which the IPN is formed show a similar modulus of elasticity, the physical properties of the pressure-sensitive adhesive may be varied according to the density or morphology of the cross-linking structure in the IPN. Also, the durability required for the pressure-sensitive adhesive for polarizing plates may depend on the density or morphology of the cross-linking structure.

If the X value is maintained at a level of 60% to 80%, the density and morphology of the cross-linking structure in the IPN, especially, of the cross-linking structure formed by the polymerized multifunctional acrylates, may be adjusted, thereby forming the pressure-sensitive adhesive showing superior durability under a high temperature and/or humidity conditions and also effectively suppresses light leakage of a polarizing plate. If the X value is less than 60% or exceeds 80%, the IPN may not be effectively formed, and physical properties such as durability may be degraded due to extreme cross-linking density.

The "X" value may be measured using methods described in the following Examples of this specification.

In order to maintain the X value of the pressure-sensitive adhesive composition to a level of 60% to 80%, the curing conditions of the pressure-sensitive adhesive composition should be controlled. For example, the pressure-sensitive adhesive composition may be cured by sequentially or simultaneously performing a curing process under suitable conditions to induce reaction of the cross-linking agent with the cross-linkable acrylic polymer, and a light irradiation process under suitable conditions to induce polymerization of a multifunctional acrylate. For example, the "X" value may be adjusted in the curing process by adjusting the illuminance and luminous intensity of radiated light during the light irradiation according to kinds of multifunctional acrylates and their reactivity, and kinds of a radical initiator such as a photoinitiator. The illuminance and luminous intensity may be varied according to kinds and contents of the multifunctional acrylate and the photoinitiator. For example, if hydroxy cyclohexyl phenyl ketone is used as the photoinitiator, the composition may be irradiated with ultraviolet (UV) rays at a luminous intensity of 100 mJ/cm$^2$ to 300 mJ/cm$^2$ within an illuminance range of 100 mW/cm$^2$ to 600 mW/cm$^2$, and, if benzyl dimethyl ketal is used as the photoinitiator, the illuminance and luminous intensity have to be slightly lower than the above-described conditions. Within these ranges, the specific illuminance and luminous intensity may be varied according to the kind or weight ratio of a multifunctional acrylate used together with the photoinitiator.

Another aspect of the present application provides a method of preparing a pressure-sensitive adhesive. The method according to one illustrative embodiment may include irradiating a composition with light such as UV rays. Here, the composition includes a cross-linkable acrylic polymer, a cross-linking agent capable of forming a cross-linking structure by being reacted the cross-linkable acrylic polymer, and a multifunctional acrylate.

For example, the light irradiation may be performed so that the X value calculated according to General Equation 1 can be in a range of 60% to 80%. The light irradiation process is not particularly limited, and may be carried out at suitable illuminance and luminous intensity to achieve a desired X value in consideration of components of the pressure-sensitive adhesive composition. For example, the light irradiation process may be a UV irradiation process, and may be performed using a known tool such as a high-pressure mercury lamp, an electrodeless lamp or a xenon lamp.

In the method, a process of inducing reaction of the cross-linking agent with the cross-linkable acrylic polymer, for example, an aging process of maintaining the composition at a suitable temperature, may also be performed. Such an aging process may be carried out, for example, before or after the light irradiation, or carried out simultaneously with the light irradiation.

For example, the light irradiation and/or aging process may be performed on the pressure-sensitive adhesive composition after the pressure-sensitive adhesive composition is coated using a bar coater or a comma coater.

Still another aspect of the present application provides a pressure-sensitive adhesive polarizing plate. The polarizing plate according to one illustrative embodiment may have a pressure-sensitive adhesive layer formed on one or both surfaces thereof. In this case, the pressure-sensitive adhesive layer may include the pressure-sensitive adhesive composition in which an IPN is formed.

For example, the polarizing plate may include a polarizer, and a protective film formed on one or both surfaces of the polarizer, and the pressure-sensitive adhesive layer may be formed on one or both surfaces of such a polarizing plate.

Kinds of the polarizer included in the polarizing plate are not particularly limited. For example, a typical polarizer such as a polyvinyl alcohol polarizer may be used herein.

The polarizer is a functional film or sheet that can extract only light oscillating in one direction from incident light oscillating in multiple directions. For example, such a polarizer may be configured so that a dichroic dye can adsorb to and be arranged on a polyvinylalcohol-based resin film. The polyvinylalcohol-based resin constituting the polarizer may be obtained, for example, by geling a polyvinylacetate-based resin. A monopolymer of vinyl acetate or a copolymer of vinyl acetate and another comonomer may be used as the polyvinylacetate-based resin. As such, examples of the comonomer copolymerizable with vinyl acetate may include an unsaturated carboxylic acid compound, an olefin compound, a vinyl ether compound, an unsaturated sulfonic acid compound and an acrylamide having an ammonium group.

Generally, a gelation degree of the polyvinylalcohol-based resin may be in a range of 85 mole % to 100 mole %, or greater than 98 mole %. The polyvinylalcohol-based resin may be further modified. For example, aldehyde-modified polyvinylformal or polyvinylacetal may be used as the polyvinylalcohol-based resin. In general, a polymerization degree of the polyvinylalcohol-based resin may be in a range of 1,000 to 10,000, or 1,500 to 5,000.

A film of the polyvinylalcohol-based resin may be formed, and used as a disc film for polarizers. A method of forming a film of the polyvinylalcohol-based resin is not particularly limited, and a typical method known in the art may be used herein. Also, a thickness of the disc film formed from the polyvinylalcohol-based resin is not particularly limited. For example, the thickness of the disc film may be properly controlled within a range of 1 μm to 150 μm. The thickness of the disc film may be properly controlled to 10 μm or more, in consideration of ease in elongation.

The polarizer may be prepared by subjecting such a polyvinylalcohol-based resin film to a series of processes including an elongation process such as a uniaxial elongation, a dyeing process using a dichroic dye, a process of adsorbing the dichroic dye, a process of treating a polyvinylalcohol-based resin film, which has the dichroic dye adsorbed thereto, with an aqueous boric acid solution, and a process of washing the film treated with the aqueous boric acid solution. As such, an iodine or dichroic organic dyestuff may be used as the dichroic dye.

Also, the polarizing plate may further include a protective film formed on one or both surfaces of the polarizer.

For example, the protective film that may be used herein may include a cellulose film such as triacetylcellulose; a polyester film such as a polycarbonate film or a polyethyleneterephthalate film; a polyethersulfone film; a polyolefin film such as a polyethylene film, a polypropylene film, a polyolefin film having a cyclo-based or norbornene structure, or an ethylene propylene copolymer; or an acrylic film, or a film having a stacked structure of at least two films, but the present application is not limited thereto.

In addition, the polarizing plate may further include at least one functional layer such as a waterproof layer, a protective layer, a reflective layer, an anti-glare layer, a retardation plate, a wide-viewing angle compensation layer or a brightness enhancement layer, as necessary.

Yet another aspect of the present application provides a liquid crystal display device (LCD). The LDC according to one illustrative embodiment may include a liquid crystal panel having the pressure-sensitive adhesive polarizing plate attached to one or both surfaces thereof.

Examples of the liquid crystal panel included in the LDC may include various liquid crystal panels known in the art, for example, liquid crystal panels of active matrix mode such as twisted nematic (TN), super-twisted nematic (STN), ferroelectic (F) and polymer-dispersed (PD) modes; liquid crystal panels of active matrix mode such as two-terminal and three-terminal modes; liquid crystal panels of an in-plane switching (IPS) mode and a vertical alignment (VA) mode.

Furthermore, the kinds of other components included in the LCD and a method of forming a device using the same are not particularly limited, and the components known in the art may be used without limitation.

DETAILED DESCRIPTION OF ILLUSTRATIVE EMBODIMENTS

Hereinafter, illustrative embodiments of the present application will be described in detail. However, the present application is not limited to the embodiments disclosed below and can be implemented in various forms. The following embodiments are described in order to enable those of ordinary skill in the art to embody and practice the present application.

EXAMPLE 1

Preparation of Cross-Linkable Acrylic Polymer 99 parts by weight n-butyl acrylate and 1.0 part by weight hydroxyethyl methacrylate were put into a 1 L reactor, through which nitrogen gas was refluxed and with which a cooling device to facilitate the temperature control was equipped. 120 parts by weight ethyl acetate was added as a solvent, and the reactor was purged with nitrogen gas for 60 minutes to remove oxygen. Subsequently, 0.03 parts by weight azobisisobutyronitrile (AIBN) was added as a reaction initiator while maintaining a temperature of 60° C., and the resulting mixture was then reacted for approximately 8 hours.

After the reaction, the mixture was diluted with ethyl acetate so that a solid content of the mixture could amount to approximately 15% by weight, thereby preparing a solution of a cross-linkable acrylic polymer having a molecular weight (Mw) of approximately 1,650,000 and a molecular weight distribution of 4.7.

Preparation of Pressure-Sensitive Adhesive Composition (Coating Solution)

20 parts by weight of trisacryloxyethyl isocyanurate as a trifunctional urethane acrylate, 1.0 part by weight of an isocyanate cross-linking agent (D110N commercially available from Mitsui Takeda Chemicals, Inc., Japan), 1.4 parts by weight of a photoinitiator, hydroxy cyclohexylphenyl ketone (commercially available from Ciba Specialty Chemicals, Switzerland), and 0.3 parts by weight of a silane coupling agent having a β-cyanoacetyl group (M812 commercially available from LG Chem. Ltd.) were blended with the prepared solution of the acrylic polymer, relative to 100 parts by weight of the solid content of the acrylic polymer. Thereafter, the coating solution was diluted so that a solid content of the coating solution could amount to approximately 15% by weight, thereby preparing a pressure-sensitive adhesive composition.

Preparation of Pressure-Sensitive Adhesive Polarizing Plate

The prepared pressure-sensitive adhesive composition was coated onto a release agent-treated surface of a 38 μm-thick PET film (MRF-38 commercially available from Mitsubishi Corporation) so that a coating layer could have a thickness after drying of approximately 25 μm, and stored at 110° C. for 3 minutes in an oven. Thereafter, the coating layer was stored in a constant temperature/humidity chamber (23° C. and 55% relative humidity (R.H.)) for 1 day, and laminated onto a wide-view (WV) coating layer of a polarizing plate having a WV liquid crystal layer coated on one surface thereof. Subsequently, the coating layer was irradiated with UV rays (illuminance: 550 mW/cm$^2$ and luminous intensity: 250 mJ/cm$^2$) using a high-pressure mercury lamp to form a pressure-sensitive adhesive layer. Then, the pressure-sensitive adhesive layer was formed on one surface of the polarizing plate to prepare a pressure-sensitive adhesive polarizing plate.

EXAMPLES 2 and 3 and COMPARATIVE EXAMPLES 1 to 5

Pressure-sensitive adhesive polarizing plates were prepared in the same manner as in Example 1, except that the weight ratios of the components in the pressure-sensitive adhesive composition and the UV irradiation conditions were adjusted as listed in the following Table 1.

TABLE 1

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Acrylic polymer content | 100 | 100 | 100 | 100 | 100 | 100 | 100 | 100 |
| MFA content | 20 | 20 | 20 | 20 | 20 | 20 | 10 | 20 |
| Cross-linking agent content | 1.0 | 1.0 | 0.5 | 1.0 | 1.0 | 1.0 | 1.0 | 1.0 |
| Photoinitiator content | 1.2 | 1.0 | 1.2 | 1.2 | 1.2 | 1.2 | 1.0 | 0.01 |
| Silane coupling agent content | 0.3 | 0.3 | 0.3 | 0.3 | 0.3 | 0.3 | 0.3 | 0.3 |
| Illuminance (unit: mW/cm$^2$) | 550 | 600 | 150 | 500 | 1,000 | 50 | 300 | 150 |
| Luminous intensity (unit: mJ/cm$^2$) | 250 | 120 | 120 | 900 | 900 | 50 | 150 | 150 |

Content unit: part(s) by weight

MFA: trisacryloxyethyl isocyanurate

Cross-linking agent: an isocyanate cross-linking agent (D110N)

Silane coupling agent: a silane coupling agent having a β-cyanoacetyl group (M812, LG Chem. Ltd.)

Photoinitiator: hydroxycyclohexylphenyl ketone (Irg184, Ciba Specialty Chemicals, Switzerland)

The pressure-sensitive adhesive compositions or the pressure-sensitive adhesive polarizing plates prepared in the Examples and Comparative Examples were measured for X value, gel fraction, peel strength, re-workability, durability and light transmission uniformity, as follows.

1. Gel Fraction

A pressure-sensitive adhesive layer was maintained in a constant temperature/humidity chamber (23° C. and 60% R.H.) for approximately 7 days, and 0.3 g (A) of the pressure-sensitive adhesive was taken and put into a 200-mesh stainless wire net, immersed in 100 mL of ethyl acetate, and maintained at room temperature for 3 days in a dark room. After that, the pressure-sensitive adhesive that was not dissolved in ethyl acetate was collected, and dried at 70° C. for 4 hours. Thereafter, a weight (B) of the dried pressure-sensitive adhesive was measured, and a gel fraction was then measured by applying the measured weight (B) to the following Equation 1.

$$\text{Gel fraction}(\%) = B/A \times 100 \quad \text{Equation 1}$$

In Equation 1, A represents a weight (0.3 g) of the pressure-sensitive adhesive before being immersed in ethyl acetate, and B represents a dry weight (units: g) of the non-dissolved and dried parts.

2. Peel Strength and Re-Workability

A pressure-sensitive adhesive polarizing plate was cut into pieces having a width of 25 mm and a length of 100 mm, a releasable PET film was removed, and the polarizing plate was then attached to an alkaline-free glass using a laminator. The attachment was performed according to JIS Z 0237 using a 2 kg roller. Thereafter, the polarizing plate was treated in an autoclave (50° C., 5 atm.) for approximately 20 minutes, and stored for 4 hours under constant temperature/humidity conditions (23° C., 50% R.H.). The peel strength was evaluated using measuring equipment (Texture analyzer commercially available from Stable Micro Systems Ltd., GB.) by peeling the polarizing plate from the glass at a peel rate of 300 mm/min and a peel angle of 180 degrees. Also, the re-workability was evaluated according to the following evaluation criteria.

<Evaluation Criteria for Re-Workability>

○: peel strength is 800 N/25 mm or less one day after the attachment.

Δ: peel strength is 1,000 N/25 mm or more one day after the attachment.

x: Peel strength is 2,000 N/25 mm or more one day after the attachment.

3. Evaluation for Durability

A pressure-sensitive adhesive polarizing plate was cut into pieces having a width of 180 mm and a length of 250 mm to prepare samples. The samples were attached to a 19-inch commercially available panel using a laminator, treated in an autoclave (50° C. and 5 atm.) for approximately 20 minutes, and then stored for 24 hours under constant temperature/humidity conditions (23° C. and 50% R.H,) to prepare samples.

The heat/humidity resistant durability was evaluated according to the following evaluation criteria by keeping the prepared samples under heat/humidity resistant conditions (60° C. and 90% R.H. for 500 hours) and observing the appearance of bubbles and peels, and the heat-resistant durability was evaluated according to the following evaluation criteria by keeping the samples under a heat-resistant condition (90° C. for 500 hours) and observing the appearance of bubbles and peels. Also, the durability was evaluated by keeping the samples under a heat-resistant or heat/humidity resistant conditions and storing the samples at room temperature for 24 hours.

<Evaluation Criteria for Durability>

○: Bubbles and peels are not generated.

Δ: Bubbles and/or peels are slightly generated.

x: Bubbles and/or peels are highly generated.

4. Light Transmission Uniformity

The evaluation of light transmission uniformity was carried out using the same samples as in the evaluation of durability. More particularly, a sample (a polarizing plate having a pressure-sensitive adhesive layer formed on one surface thereof) was attached to a 22-inch monitor (LG Philips LCD)), stored for one day, and kept at 80° C. for 240 hours in an oven. Thereafter, four corners and a central region of the monitor were evaluated for light transmission uniformity. The light transmission uniformity may be evaluated using a spectroradiometer CS-2000 (Konica-Minolta, Japan) by measuring brightness from constant distances in up, down, left and right directions with respect to the central region of the monitor and calculating a brightness-increment rate based on the central region of the monitor.

The greater a brightness increase is in up and down or left and right directions, the more light leakage is.

5. Evaluation of X Value

IR spectra for the pressure-sensitive adhesive composition before/after formation of the IPN structure were measured according to the following method to obtain the parameters "AI," "BI," "AO" and "BO" and calculate an X value according to General Equation 1.

A sample of the pressure-sensitive adhesive composition in which the IPN was formed was prepared by irradiating the pressure-sensitive adhesive composition coated onto a polarizing plate according to the method described in Examples or Comparative Examples with UV rays under the conditions listed in Table 1, aging the pressure-sensitive adhesive composition for 7 days under constant temperature/humidity conditions (23° C. and 50% R.H.) and cutting the polarizing plate into pieces having a width of 2 cm and a length of 4 cm.

Also, a sample of the pressure-sensitive adhesive composition before formation of the IPN was prepared by coating a polarizing plate with the pressure-sensitive adhesive composition using the method described in Examples or Comparative Examples and cutting the polarizing plate into pieces having a width of 2 cm and a length of 4 cm before irradiation with UV rays.

The background scanning was carried out in a state in which an FT-IR ATR-mode sample stage was vacant before measurement of IR spectrum.

A releasable PET film was removed from the sample, and the releasable PET film-free sample was put on the FT-IR ATR-mode sample stage so as to prevent contamination of the pressure-sensitive adhesive. Thereafter, the sample was pressured to sufficiently overlap diamond crystals. The measurement was repeated twice, and the IR spectrum was calculated from the measurement results, followed by measuring the parameters "AI," "BI," "AO" and "BO."

Measuring equipment and measurement conditions were as follows.

<Measuring Equipment>

FT-IR (BIo-Rad FTS 3000, BIo Rad) with Golden Gate Single Reflection ATR system

<Measurement Conditions>

Wave number: 550 to 4000 $cm^{-1}$

Number of scans: 16 cycles

Resolution: 4 $cm^{-1}$

Detector: DTGS

The measurement results are summarized in the following Table 2.

TABLE 2

|  | Examples | | | Comparative Examples | | | | |
| --- | --- | --- | --- | --- | --- | --- | --- | --- |
|  | 1 | 2 | 3 | 1 | 2 | 3 | 4 | 5 |
| X value of General Equation 1 | 75 | 69 | 63 | 86 | 90 | 49 | 68 | 45 |
| Gel fraction (%) | 95 | 96 | 93 | 92 | 92 | 90 | 85 | 83 |
| Peel strength (N/25 mm) | 280 | 320 | 400 | 45 | 59 | 340 | 470 | 550 |
| Re-workability | ○ | ○ | ○ | ○ | ○ | ○ | Δ | Δ |
| Heat-resistant durability | ○ | ○ | ○ | x | x | Δ | ○ | Δ |
| Damping durability | ○ | ○ | ○ | x | x | x | ○ | x |
| Brightness-increment rate (up and down) (%) | 27 | 35 | 29 | 25 | 18 | 110 | 196 | 287 |
| Brightness-increment rate (right and left) (%) | 35 | 42 | 32 | 21 | 15 | 150 | 373 | 310 |

The pressure-sensitive adhesive composition according to the illustrative embodiments exhibits excellent durability reliability under extreme conditions such as high temperature and/or humidity conditions and shows superior workability such as cuttability or re-workability. Also, when the pressure-sensitive adhesive composition is applied to a polarizing plate or a liquid crystal display device, the composition can effectively prevent light leakage. Such a pressure-sensitive adhesive exhibits excellent characteristics, for example, even when the pressure-sensitive adhesive is applied to a 20-inch or more large display device.

What is claimed is:

1. A method of preparing a pressure-sensitive adhesive, the method comprising curing a pressure sensitive adhesive composition:
    wherein the curing includes irradiating the pressure-sensitive adhesive composition with light so as for the X calculated by the following General Equation 1 to be 60% to 80%, wherein the pressure-sensitive adhesive composition comprises 100 parts by weight of cross-linkable acrylic polymer; 0.01 to 5 parts by weight of cross-linking agent forming a cross-linking structure when reacted with the acrylic polymer; 20 to 40 parts by weight of multifunctional acrylate that is a trifunctional acrylate; and 1 to 10 parts by weight of a radical initiator, wherein the pressure-sensitive adhesive composition forms an interpenetrating polymer network (IPN) after the curing:

$$X=[1-(AI/BI)/(AO/BO)]\times 100 \qquad \text{General Equation 1}$$

wherein "AI" represents an area of peak observed between 795 cm$^{-1}$ and 820 cm$^{-1}$ in IR spectrum of the pressure-sensitive adhesive composition after forming the interpenetrating polymer network, "BI" represents an area of peak observed between 1,780 cm$^{-1}$ and 1,650 cm$^{-1}$ in IR spectrum of the pressure-sensitive adhesive composition after forming the interpenetrating polymer network, "AO" represents an area of peak observed between 795 cm$^{-1}$ and 820 cm $^{-1}$ IR spectrum of the pressure-sensitive adhesive composition before forming the interpenetrating polymer network, and "BO" represents an area of peak observed between 1,780 cm$^{-1}$ and 1,650 cm$^{-1}$ in IR spectrum of the pressure-sensitive adhesive composition before forming the interpenetrating polymer network, and wherein X represents a percentage of the multifunctional acrylates converted into the cross-linking structure during the curing, and the curing comprises controlling the X value to 60% to 80% by adjusting an illuminance and a luminous intensity of radiated light during the irradiation.

2. A method of preparing a pressure-sensitive adhesive, the method comprising curing a pressure sensitive adhesive composition:
    wherein the curing includes irradiating the pressure-sensitive adhesive composition with light so as for the X calculated by the following General Equation 1 to be 63% to 75%,
    wherein the pressure-sensitive adhesive composition comprises 100 parts by weight of cross-linkable acrylic polymer; 0.01 to 5 parts by weight of cross-linking agent forming a cross-linking structure when reacted with the acrylic polymer; 20 to 40 parts by weight of multifunctional acrylate that is a trifunctional acrylate; and 1 to 10 parts by weight of a radical initiator,
    wherein the pressure-sensitive adhesive composition forms an interpenetrating polymer network (IPN) after the curing:

$$X=[1-(AI/BI)/(AO/BO)]\times 100 \qquad \text{General Equation 1}$$

wherein "AI" represents an area of peak observed between 795 cm$^{-1}$ and 820 cm$^{-1}$ in IR spectrum of the pressure-sensitive adhesive composition after forming the interpenetrating polymer network, "BI" represents an area of peak observed between 1,780 cm$^{-1}$ and 1,650 cm$^{-1}$ in IR spectrum of the pressure-sensitive adhesive composition after forming the interpenetrating polymer network, "AO" represents an area of peak observed between 795 cm$^{-1}$ and 820 cm$^{-1}$ in IR spectrum of the pressure-sensitive adhesive composition before forming the interpenetrating polymer network, and "BO" represents an area of peak observed between 1,780 cm$^{-1}$ and 1,650 cm$^{-1}$ in IR spectrum of the pressure-sensitive adhesive composition before forming the interpenetrating polymer network, and wherein X represents a percentage of the multifunctional acrylates converted into the cross-linking structure during the curing, and wherein the curing comprises controlling the X value to 63% to 75% by adjusting an illuminance and a luminous intensity of radiated light during the irradiation.

3. The method of claim 1, wherein the curing includes irradiating the pressure-sensitive adhesive composition with light having a luminous intensity of 100-300 mJ/cm$^2$ and an illuminance range of 100-600 mW/cm$^2$.

4. The method of claim 2, wherein the curing includes irradiating the pressure-sensitive adhesive composition with light having a luminous intensity of 100-300 mJ/cm$^2$ and an illuminance range of 100-600 mW/cm$^2$.

5. The method of claim 1, wherein the curing includes irradiating the pressure-sensitive adhesive composition with light having a luminous intensity of 100-300 mJ/cm$^2$ and an illuminance range of 100-550 mW/cm$^2$.

6. The method of claim 2, wherein the curing includes irradiating the pressure-sensitive adhesive composition with light having a luminous intensity of 100-300 mJ/cm$^2$ and an illuminance range of 100-550 mW/cm$^2$.

* * * * *